(12) United States Patent
Becker

(10) Patent No.: US 8,890,475 B1
(45) Date of Patent: Nov. 18, 2014

(54) AUTOMOBILE CHARGING AND COMMUNICATIONS STATION

(76) Inventor: Gilbert Scott Becker, Napa, CA (US)

( * ) Notice: Subject to any disclaimer, the term of this patent is extended or adjusted under 35 U.S.C. 154(b) by 374 days.

(21) Appl. No.: 13/200,684

(22) Filed: Sep. 27, 2011

Related U.S. Application Data

(60) Provisional application No. 61/404,111, filed on Sep. 28, 2010.

(51) Int. Cl.
*H02J 7/00* (2006.01)
*B60L 9/00* (2006.01)
*B60W 10/24* (2006.01)
*B60L 11/18* (2006.01)

(52) U.S. Cl.
CPC ......... *B60L 11/1827* (2013.01); *B60L 11/1818* (2013.01)
USPC ............................ 320/109; 701/22; 180/65.29

(58) Field of Classification Search
CPC ........................ B60L 11/1818; B60L 11/1827
USPC ............................ 320/109; 701/22; 180/65.29
See application file for complete search history.

(56) References Cited

U.S. PATENT DOCUMENTS 5,559,420 A *  9/1996 Kohchi ........................ 180/68.5
7,972,167 B2 *  7/2011 Amit et al. ................... 439/456
7,993,155 B2 *  8/2011 Heichal et al. ............... 439/374
8,006,793 B2 *  8/2011 Heichal et al. ............... 180/68.5
8,035,341 B2 * 10/2011 Genzel et al. ................. 320/109
8,473,131 B2 *  6/2013 Leary ............................ 701/22
2007/0046103 A1 *  3/2007 Belady et al. ................. 307/12
2010/0039067 A1 *  2/2010 Hill et al. ..................... 320/109
2010/0228405 A1 *  9/2010 Morgal et al. ................ 701/2
2010/0292877 A1 * 11/2010 Lee ............................... 701/21
2011/0140657 A1 *  6/2011 Genzel et al. ................. 320/109

* cited by examiner

*Primary Examiner* — M'Baye Diao
(74) *Attorney, Agent, or Firm* — Risto A. Rinne, Jr.

(57) ABSTRACT

An apparatus for charging batteries of an electric or hybrid vehicle includes a station. The station is located at a parking lot of a business. The station is preferably connected to a telephone line, CAT 5 or other cable, Internet or Wi-Fi to accommodate communication. A computer is connected to a remote server to receive updated vehicle charging parameters. A pivoting docking boom on the station cooperatively engages with a vehicle-charging boom located on the vehicle. Electrical contact pins on the vehicle-charging boom mate with sockets on the docking boom. A centerline pin grounds the vehicle to the station. The electrical contact pins permit up to three-phase charging capability and transmission of desired data. The station monitors the charging of the batteries and reports any problems. The station performs vehicle and payment confirmation without the driver exiting the vehicle. An alternate embodiment includes the station at a residence or garage.

19 Claims, 5 Drawing Sheets

AUTOMOBILE CHARGING AND COMMUNICATIONS STATION

This patent application claims the Benefit of Priority of Provisional Patent Application Ser. No. 61/404,111 that was filed on Sep. 28, 2010 by the same inventor, Gilbert Scott Becker, entitled "Hands Free Electric Universal Automobile Charging Station and Associated Equipment".

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention, in general, relates to electric vehicles and, more particularly, to a station for charging a battery within the electric vehicle and communicating information regarding the vehicle to a driver or other desired sources.

As people are becoming more consciously aware of their carbon footprint (an amount of emitted greenhouse gases caused by one person) on the world, more are seeking alternative ways to lessen their impact. Additionally, people are trying to reduce their dependence on petroleum-based fuel and oil sources. An increasingly popular method to do so is by use of an electric vehicle.

Electric vehicles are well known and increasing in popularity. As used herein, the term electric vehicle includes any type of an electric motor powered automobile used for the transport of passengers or goods.

A hybrid vehicle uses an electric motor for propulsion in combination with a gasoline engine for power and its batteries can also be charged by this invention.

Alternatively, the electric vehicle may only be powered by a rechargeable battery or batteries and not require any gasoline.

Whenever a vehicle receives some or all of its motive power from electricity, the issues of storage of electrical charge (energy) and replenishment of the electrical charge arise.

There is a need to charge a vehicle's battery or batteries (whether electric or otherwise) when the vehicle is at home or away from home.

Currently, an alternator (or generator) is typically used (whenever an internal combustion engine is used) to supply the required charging current to replenish the electrical charge in the storage battery or batteries. However, it takes energy from the engine to charge the vehicle's batteries.

This decreases fuel economy for hybrid vehicles and maximum range for electric vehicles. Charging the batteries of a hybrid vehicle without using gasoline (i.e., and internal combustion engine) would also help to extend the electric vehicle's maximum range. Hybrids and electrical vehicles may be able to extract a small amount of electrical energy during braking which can be used to replenish the charge in the batteries, however, this effect is minimal and the need to periodically recharge the vehicle's batteries remains.

However, a quick and convenient way to efficiently charge an electric or hybrid vehicle has yet to materialize and become widely used.

Currently there are limited quantities of charging stations available for replenishment of electrical energy to the vehicle's batteries. As such, these charging stations are not widely distributed in many areas and some existing stations are obsolete in light of current changes in technology. A person driving an electric vehicle is likely to limit their driving range if they feel risk in their vehicle's battery life. A convenient source for replenishment may not be near to where they are traveling or the person may opt for non-electric transportation instead.

In addition, the charging stations require a person to exit their vehicle to manually insert a plug into their vehicle to receive a charge. Some people may have apprehension about handling a power cord for charging their vehicle. If the vehicle is not properly accepting a charge, the electrical power flowing through the power cord may overheat the cord and socket and pose a risk to a person handling the cord or, worst case, start an electrical fire that could destroy the vehicle and perhaps surrounding structures.

The person may also forget that their vehicle is plugged into the charging station and proceed in moving their vehicle away from the charging station. The charging cord, charging station and/or the vehicle may then be subject to extensive damage and expensive repair costs should the person continue driving away with the charging cord still attached to their vehicle.

As batteries include different charging ranges, rates of charge, and capacities, it is difficult to determine which electrical power voltage should be applied and for how long. A person may unknowingly connect their vehicle to an improper charging station expecting their vehicle to be charged. The vehicle is likely to not charge and damage to the battery or vehicle may occur.

Additionally, unknown to the operator, the vehicle may be experiencing a mechanical or an electrical problem and should be provided with timely proper maintenance. A vehicle owner (or operator) may continue to drive the vehicle and remain unaware of the vehicle issue. A potential for an accident or vehicle break-down arises which may have been avoided if the owner became aware of and resolved the problem in a timely manner.

Additionally, as a default (to avoid overcharging) most charging stations limit the rate of charge to a safe, but low rate that is compatible for most electric vehicle types. This increases the time required to charge many vehicle's batteries. Ideally, a charging station would determine the maximum rate of charge parameters for each vehicle and adjust the power delivery (voltage and current) to supply the maximum rate of charge possible for each vehicle.

Accordingly, there exists today a need for an automobile charging and communications station that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, such an apparatus and system would be useful and desirable.

2. Description of Prior Art

Electric vehicle charging stations are, in general, known.

While the structural arrangements of the presently know devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an automobile charging and communications station that provides a convenient connection of an electric or a hybrid vehicle to the charging station.

It is also an important object of the invention to provide an automobile charging and communications station that allows hands-free connection of an electric or a hybrid vehicle to the charging station.

Another object of the invention is to provide an automobile charging and communications station that conducts all aspects of charging an electric or a hybrid vehicle, including electrical and mechanical connection as well as payment, without having to exit the vehicle.

Still another object of the invention is to provide an automobile charging and communications station that enables communication between an electric vehicle or a hybrid vehicle and the charging station (i.e., the vehicle identifies itself to the charging station).

Still yet another object of the invention is to provide an automobile charging and communications station that receives a wireless signal from an electric vehicle or a hybrid vehicle that identifies crucial information about the vehicle.

Yet another important object of the invention is to provide an automobile charging and communications station that communicates via a cellular phone by a plurality of voice prompts or other means to optimally enable connection of an electric or a hybrid vehicle to the station.

Still yet another important object of the invention is to provide an automobile charging and communications station that communicates desired data by a cellular phone, BLUETOOTH™, hard wire text data or a Wi-Fi signal to and from an electric or a hybrid vehicle.

A first continuing object of the invention is to provide an automobile charging and communications station that can be used at a residence.

A second continuing object of the invention is to provide an automobile charging and communications station that can be used at a commercial location.

A third continuing object of the invention is to provide an automobile charging and communications station that can optionally charge a plurality of different models of electric or hybrid vehicles.

A fourth continuing object of the invention is to provide an automobile charging and communications station that can optionally charge a plurality of different battery types or battery configurations.

A fifth continuing object of the invention is to provide an automobile charging and communications station that monitors desired parameters of a battery during charging.

A sixth continuing object of the invention is to provide an automobile charging and communications station that monitors desired parameters of a battery during charging and will stop charging the battery should a problem be detected.

A seventh continuing object of the invention is to provide an automobile charging and communications station that includes a computer.

An eighth continuing object of the invention is to provide an automobile charging and communications station that verifies an electric or a hybrid vehicle's location using a GPS signal.

A ninth continuing object of the invention is to provide an automobile charging and communications station that uses a vehicle's GPS signal to confirm proper approach toward the station by the vehicle.

A tenth continuing object of the invention is to provide an automobile charging and communications station that verifies an electric or a hybrid vehicle's vehicle identification number (VIN).

An eleventh continuing object of the invention is to provide an automobile charging and communications station that verifies an electric or a hybrid vehicle's vehicle identification number (VIN) and notifies a proper law authority should the vehicle be listed as stolen.

A twelfth continuing object of the invention is to provide an automobile charging and communications station that optionally verifies if an authorized user is attempting to charge a vehicle.

A thirteenth continuing object of the invention is to provide an automobile charging and communications station that will not charge a vehicle should an unauthorized user attempt to charge the vehicle.

A fourteenth continuing object of the invention is to provide an automobile charging and communications station that accepts a debit or a credit card as a form of payment to bill a user for charging their vehicle at the station.

A fifteenth continuing object of the invention is to provide an automobile charging and communications station that optionally includes a keypad on a dashboard of an electric or a hybrid vehicle for a user to enter a pin number for use with a debit card.

A sixteenth continuing object of the invention is to provide an automobile charging and communications station that optionally includes a card reader on a dashboard of an electric or a hybrid vehicle that allows a user to swipe a debit or a credit card as a form of payment for the charging of the vehicle.

A seventeenth continuing object of the invention is to provide an automobile charging and communications station that can optionally store credit card information in a vehicle and provide that information to the automobile charging and communications station either by hard-wire interface or by wireless transmission.

An eighteenth continuing object of the invention is to provide an automobile charging and communications station that includes a pivoting docking boom that is able to move in an upward or a downward direction.

A nineteenth continuing object of the invention is to provide an automobile charging and communications station that is able to cooperate with a vehicle-charging boom which is housed within a compartment of a vehicle.

A twentieth continuing object of the invention is to provide an automobile charging and communications station that is able to cooperate with a vehicle-charging boom that extends from a vehicle.

A twenty-first continuing object of the invention is to provide an automobile charging and communications station that includes a button on a dashboard of an electric or a hybrid vehicle that controls movement of a vehicle-charging boom that is attached to the vehicle.

A twenty-second continuing object of the invention is to provide an automobile charging and communications station that includes a vehicle-charging boom that extends upward from a vehicle to cooperatively engage with an adjustable downward-facing docking boom of the station.

A twenty-third continuing object of the invention is to provide an automobile charging and communications station that includes a docking boom that changes a position (i.e., angle) depending on a vehicle type.

A twenty-fourth continuing object of the invention is to provide an automobile charging and communications station that includes a vehicle-charging boom or a docking boom that is preferably able to retract and thereby shorten its overall length as a vehicle drives forward.

A twenty-fifth continuing object of the invention is to provide an automobile charging and communications station that includes a docking boom with a female end and a vehicle-charging boom with a male end which cooperatively engage when placed proximate one-another.

A twenty-sixth continuing object of the invention is to provide an automobile charging and communications station that is adapted to cooperate with a vehicle-charging boom with a centerline pin.

A twenty-seventh continuing object of the invention is to provide an automobile charging and communications station that is adapted to cooperate with a vehicle-charging boom which includes a plurality of electrical contact pins.

A twenty-eighth continuing object of the invention is to provide an automobile charging and communications station that is adapted to cooperate with a vehicle-charging boom which includes a plurality of electrical contact pins that cooperatively engage with a plurality of sockets on a docking boom of the station.

A twenty-ninth continuing object of the invention is to provide an automobile charging and communications station that includes a variable charging capability from single-phase 120 VAC to three-phase charging.

A thirtieth continuing object of the invention is to provide an automobile charging and communications station that reduces a risk of vehicle fires.

A thirty-first continuing object of the invention is to provide an automobile charging and communications station that is able to receive payment from a debit card, credit card, or any other payment system including wireless debit systems, including FASTRAK™.

Briefly, an automobile charging and communications station that is constructed in accordance with the principles of the present invention has a charging station that is used for charging a battery or batteries of an electric or a hybrid vehicle. The charging station is preferably a steel structure mounted to a concrete support block. The charging station is preferably located at a front-end of a parking space. The charging station may be located at a parking lot of an existing business or the charging station may be designed to be it's own business. The charging station is optionally connected to a cellular or a land-based telephone line or Internet or Wi-Fi to accommodate various forms of communication and related services. A computer is provided within an interior of the charging station. The computer is connected to a remote server that communicates directly with the computer. If preferred, a CAT 5 or other type of cable may be provided to allow the computer to communicate directly with the vehicle. The computer is preferably connected to the Internet to allow the computer to receive updated downloads. The downloads ensure that the computer has the most recent parameters for the charging of a particular type of the electric or hybrid vehicle. The parameters consist of various vehicle types and their corresponding batteries, the batteries' storage capacity, a rate at which the vehicle can be charged, a charging current to be applied to the batteries, and battery temperature parameters. Other desired parameters may also be included. The charging station monitors the vehicle's parameters to ensure that a safe and proper charge is provided to the battery or batteries. The charging station also detects charging anomalies and alters or stops charging, depending on the anomaly, and informs a vehicle operator (i.e., driver). The charging station includes a pivoting docking boom. The docking boom is preferably a steel arm (or other type of material) that extends outward and away from the charging station. An upper end of the docking boom is attached at an upper end of the charging station. A lower end of the docking boom is disposed away from the charging station and is able to pivot up or down. The lower end of the docking boom includes a female cone-shaped opening. A plurality of electrical contact sockets are located in an interior of the docking boom proximate the opening. The electric or hybrid vehicle includes a corresponding vehicle-charging boom. The vehicle-charging boom is housed within a recessed compartment located on a hood of the vehicle. The compartment includes a door that protects the vehicle-charging boom when it is not in use. The vehicle-charging boom may also extend outward from a front-end of the vehicle (i.e., grille). The vehicle-charging boom is preferably formed of a steel arm (or other material) that includes a cone-shaped male end at an upper end, thereof. A sleeve surrounds the upper end, which protects a plurality of electrical contact pins. Located at a center of the cone-shaped male end is a centerline pin. A button (or buttons) located on a dashboard controls movement of the vehicle-charging boom. By pressing the button, the door of the compartment is opened. The vehicle-charging boom is either lifted upward or lowered downward by an actuator or any other preferred means. As the driver approaches the parking space of the charging station, the driver presses the button on the dashboard. The vehicle-charging boom is raised upward from within the compartment in the hood of the vehicle. Alternately, the vehicle-charging boom may extend from the front-end of the vehicle. The docking boom pivots downward to the proper angle and position to engage the vehicle-charging boom. As the driver approaches the charging station, a wireless electronic signal is transmitted to the charging station. The signal may include BLUETOOTH™, Wi-Fi, or any other preferred wireless communication. The wireless signal transmits crucial data regarding the vehicle. The data includes identifying information such as a make, model and year of the vehicle as well as the type of battery or batteries used within the vehicle. Different vehicles will have different types of batteries, especially as battery technologies evolve. The vehicle's unique vehicle identification number (VIN) is also transmitted to the charging station. If desired, transmission of the data concerning the type of batteries in the vehicle can be eliminated. Instead, transmission of the make, model, and year along with the VIN can be used by the station to determine the type of the vehicle batteries and all charging parameters by a lookup. If changes in the vehicle's batteries or charging parameters occur for any given model (even during the same model year), these changes will be reflected in the vehicle's VIN. Accordingly, the station can always configure itself to optimally charge the vehicle's batteries. Once the VIN has been received by the charging station, the computer checks the VIN to see if the vehicle has been reported stolen. If the vehicle is listed as stolen, the charging station reports a location of the vehicle via a GPS (Global Positioning System) signal to a proper law authority. A GPS system and device is preferably included in the vehicle. As the vehicle continues to move forward, the docking boom aligns itself along a center longitudinal axis with respect to the vehicle-charging boom. The vehicle's GPS system may also be used to help align the vehicle with the docking boom and ensure proper advance by the vehicle. For example, proper approach positioning of the vehicle may be indicated by a green light on the charging station or by information that is communicated to and displayed in the vehicle. The data sent to the charging station includes a height and an angle description of the vehicle-charging boom and the docking boom adjusts itself accordingly both in angle and in overall length. Preferably, all vehicles will eventually have a standard height and angle for the vehicle-charging boom. The centerline pin is the first pin to contact the docking boom. The centerline pin cooperatively engages with a center socket within the docking boom. The centerline pin is used to electrically ground the vehicle to the charging station in order to prevent risk of electrical or static shock. As the vehicle-charging boom is being connected to the docking boom, the sleeve of the vehicle-charging boom is pushed back to expose the electrical contact pins. Each electrical contact pin is preferably spring-loaded and positioned on a socket that is able to swivel slightly to accommodate odd angles, should the vehicle-charging boom be connected in a less than perfectly straight orientation. Three of the electrical contact pins each correspond to a different phase for charging of the vehicle. A neutral contact pin is also provided. The remaining electrical contact pins are used for supplying any desired data and for identification of the vehicle or to assist in billing and payment for the electrical energy that is used to charge the vehicle. As mentioned previously, the data may be sent as a wireless signal. By using the electrical contact pins to supply the data ensures that a secure transfer of the data is provided. As the vehicle-charging boom makes proper connection with the docking boom of the charging station, a red light is illuminated on the charging station. The red light notifies the driver that a complete connection has been accomplished. The driver stops moving the vehicle forward and places the vehicle in park. A concrete stopper may be provided proximate the front-end of the parking space to prevent the driver from driving too far forward and impacting the charging station. A card reader is preferably included on the dashboard of the vehicle. The driver uses a credit or a debit card as a means for payment for the electrical energy supplied to charge the vehicle's batteries. The vehicle may also store an authorized user's credit or debit card information and automatically transmit the information to the charging station. The credit or debit card information may be transmitted via the wireless signal or through the electrical contact pins. A keypad may also be included on the dashboard that allows the driver to enter a pin number that is associated with the debit card. The keypad may also be used to enter a user code to verify that an authorized user is attempting to charge the vehicle. If an unauthorized user tries to enter an unrecognized credit or debit card or improper user code, the authorized user is preferably notified by a telephone call, over the Internet or by any other preferred means. The charge will not be completed should an unauthorized user be detected. Once the payment and user status have been confirmed, the vehicle is ready for charging. A green or other color light or written display on the charging station is illuminated to notify the driver that the vehicle is accepting a charge. The driver may then exit their vehicle while the vehicle is being charged or the driver may remain in the vehicle. A blinking green light may be used to indicate that the vehicle is accepting only a partial (i.e., unusually slow) charge. The partial charge may indicate that the battery is not functioning properly. The vehicle will not be charged should the charging station detect a severe mechanical or electrical problem within the vehicle. Any diagnostic obtained by the charging station communicates the problem via a computer code back to the vehicle's on-board diagnostic (OBD-II) system or other available technology in the vehicle. The driver is notified that their vehicle may be in need of service. The charging station monitors the battery (or batteries) to verify that the proper current and rate of charge is being provided to the battery (or batteries) of that particular type of vehicle. In addition, the charging station monitors the battery's temperature to ensure that the battery does not overheat during charging. Should the battery overheat, the charging station will either slow the rate of charge or shut down depending on whether or not the vehicle's charging parameters have been sufficiently exceeded. An overheated battery is prone to catch fire or explode and can pose a serious risk to the driver of the vehicle. If the battery does not properly charge, the diagnostic of the charging station communicates the reason to the vehicle's OBD-II system to inform the driver. This type of monitoring can prevent battery failure and an inoperative vehicle. It can also lead to a repair of a minor problem before it becomes serious. The electrical contact pins on the vehicle-charging boom offer up to a three-phase charging cycle. A use of single-phase charging provides an electrical voltage of 120-VAC. A use of two-phase charging provides an electrical voltage of 240-VAC. A use of three-phase charging provides a maximum rate of charge using all three electrical voltage contact pins and the neutral pin. As may be required, the supplied voltage is adjusted (i.e., AC to DC) and the current is regulated to conform with the vehicle's charging parameters. Almost all electric or hybrid vehicles are able to accept a single-phase charge cycle. Those that can benefit from two or three phase charging can be charged more rapidly. After the vehicle has been fully charged, a completion light on the dashboard may illuminate to signal that the vehicle has been fully charged. Alternately, the completion light may be illuminated on the charging station. Once the charge has been completed, as an optional capability of the charging station, the driver may be notified by their cellular phone to return to their vehicle. The charging station provides a receipt that details how much electrical energy was supplied to the battery and the amount that was billed to the user's credit or debit card. A meter on the charging station measures how much electrical energy was provided to the vehicle. The receipt can be a paper or an electronic receipt. An alternate embodiment includes a modified charging station for use at a residence. The modified charging station is preferably located on wall of a garage of the user's residence. The modified charging station includes the docking boom. Upon opening of a garage door, the driver presses the button on the dashboard to raise the vehicle-charging boom. The opening of the garage door may also trigger the wall-mounted charging station to lower the docking boom. The driver aligns the vehicle-charging boom with the docking boom along the center longitudinal axis by driving the vehicle forward. The centerline and the electrical contact pins similarly engage with the sockets on the docking boom. The red light is illuminated on the charging station to notify the driver that the connection is complete and to stop the vehicle. The driver may use the keypad to enter their user code to begin the charge cycle or it may be configured to always charge the vehicle when at home. Once the charge cycle has commenced, the driver exits the vehicle.

DETAILED DESCRIPTION OF THE INVENTION

Figure 1:
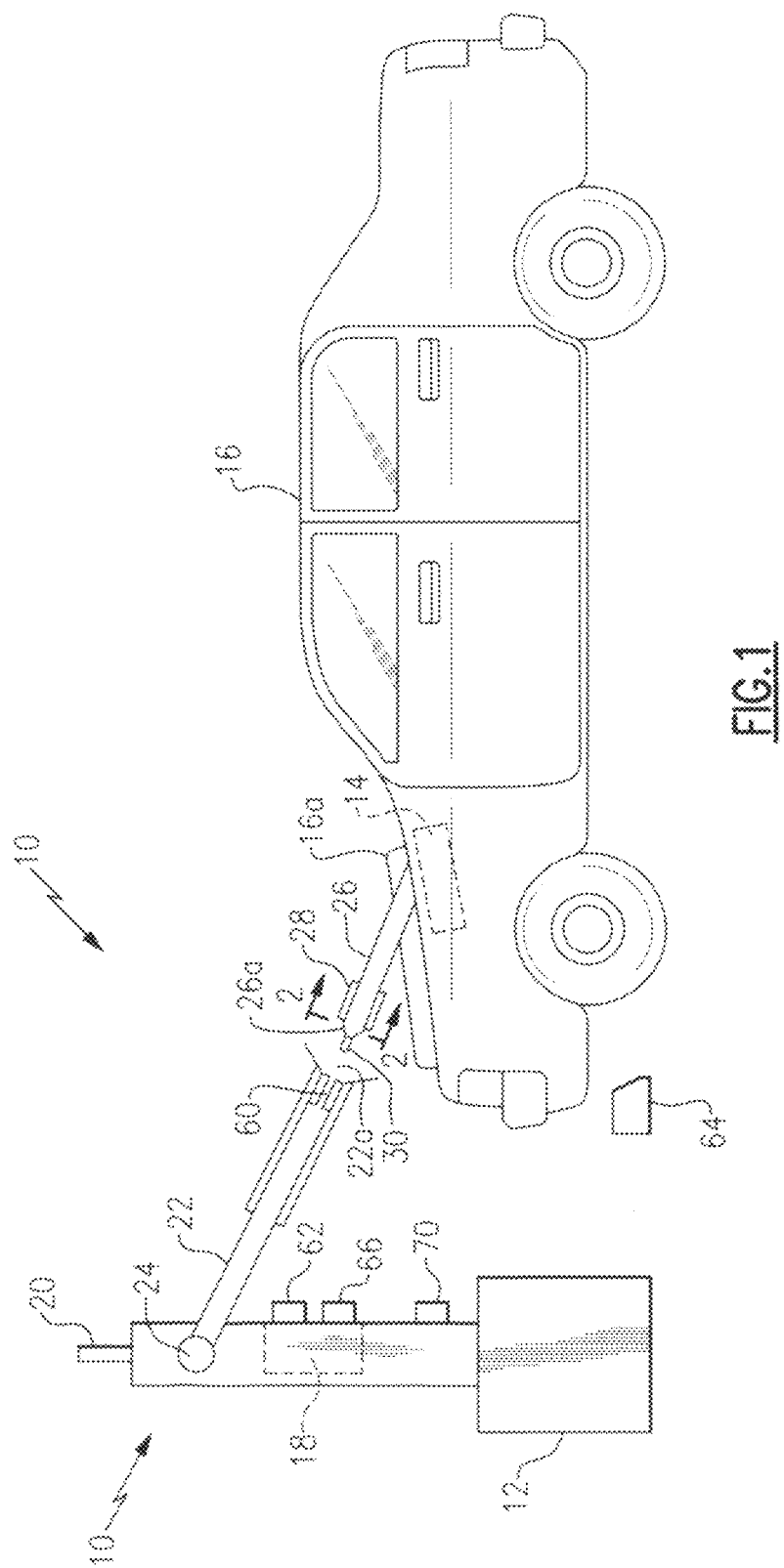
FIG. 1 is a side view of an electric or a hybrid vehicle approaching a commercial automobile charging and communications station.

Referring on occasion to all of the FIGURE drawings and now, in particular to FIG. 1, is shown an automobile charging and communications station, identified in general, by the reference numeral 10.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

Certain examples are shown in the above-identified FIGURES and are described in greater detail below. In describing these examples, like or identical reference numerals may be used to identify common or similar elements.

The automobile charging and communications station 10 is preferably a steel structure mounted to a concrete support block 12. The automobile charging and communications station 10 is used for charging a battery or batteries 14 (shown in dashed lines) of an electric or a hybrid vehicle 16.

As the vehicle 16 relies on the batteries 14 to supply power for it's motion, keeping the batteries 14 within the vehicle 16 charged is a high priority. A driver (not shown) may be driving the vehicle 16 and realize that an electrical charge within the batteries 14 is low. This is especially important for electric (not hybrid) types of the vehicle 16.

As the driver may be away from home at the time of the realization, a convenient location to charge the vehicle 16 batteries 14 is desirable. This need is analogous to the need to periodically refuel internal combustion engines.

The charging station 10 is designed to be an easily accessible unit used for charging the batteries 14 of the vehicle 16 while the driver is on the road. The charging station 10 is preferably located at a parking lot of an existing business or the charging station 10 may be designed to be it's own business.

The charging station 10 is preferably located at a front-end of a parking space (not shown). The driver positions the vehicle 16 into the parking space to use the charging station 10 to supply the batteries 14 with an electrical charge.

As electric and hybrid vehicles 16 are becoming increasingly popular, different automobile manufacturers are designing their own versions of the electric and hybrid vehicles 16.

Once the driver places the vehicle 16 proximate the charging station 10, the charging station 10 will need to determine what type of vehicle 16 is in need of charging.

A computer 18 (dashed lines) is located within an interior of the charging station 10 or it may be remotely housed. The computer 18 stores a plurality of charging parameters for a wide-variety of vehicles 16 and their corresponding batteries 14. The computer 18 is connected to a remote server (not shown).

The computer 18 is preferably connected to the Internet to allow the computer 18 to communicate with the remote server or other desired sources. The computer 18 is able receive updated downloads via the remote server or by connecting to the Internet. If desired, the computer 18 may be updated manually by a technician (not shown). The downloads provide the computer 18 with the most recent parameters used for the optimal charging of any of the many types of the electric or hybrid vehicle 16 that are expected to become available.

The parameters consist of various vehicle 16 types and their corresponding types of batteries 14. Other parameters include the batteries 14 storage capacity, a rate at which the vehicle's 16 batteries 14 can be charged, an ideal charging current and voltage to be applied to the batteries 14, and the batteries 14 specific permissible temperature ranges. Other desired parameters may also be included.

During operation, the charging station 10 monitors the vehicle's 16 parameters to ensure that a safe and proper charge is being provided to the battery or batteries 14. If the charging process was not monitored, the vehicle 16 may not receive a proper (sufficient) charge or the vehicle 16 and/or the batteries 14 may become damaged during the charging process if an excessive charge is applied. This also permits the most rapid rate of charging that is possible for each vehicle 16 type.

The charging station 10 is optionally connected to a cellular or a land-based telephone line, Internet or Wi-Fi to accommodate various forms of communication and services. An antenna 20 may be included, for example, at an upper portion of the charging station 10, to further aid in communication efforts.

If preferred, a CAT 5 cable (not shown) or other type of cable may be provided instead of the telephone line to allow a connection for the computer 18 to communicate directly with the vehicle 16.

The charging station 10 includes a pivoting docking boom 22. The docking boom 22 is preferably a telescoping arm (i.e., a rod) that extends outward and away from the charging station 10. The docking boom 22 may be made from any preferred material such as plastic, fiberglass or steel.

A pivot joint 24 located at an upper end of the docking boom 22 is attached at the upper portion of the charging station 10. The pivot joint 24 allows a distal lower end of the docking boom 22 to be adjustable in height by pivoting the lower end up or down a desired amount depending on the type of the vehicle 16. Adjusting the height of the docking boom 22 will be described in greater detail, hereinafter.

The lower end of the docking boom 22 is disposed away from the charging station 10. The lower end of the docking boom 22 preferably includes a female cone-shaped opening 22a. It is understood that while a preferred arrangement is described that provides offset and ease of connection, that other types of connectors are possible.

The electric or hybrid vehicle 16 includes a vehicle-charging boom 26. The vehicle-charging boom 26 may be made from any preferred material such as plastic, fiberglass or steel. The vehicle-charging boom 26 preferably includes a smaller diameter (or width) than that of the docking boom 22. This is to ensure proper engagement when the vehicle-charging boom 26 is connected to the docking boom 22 of the charging station 10. The vehicle-charging boom 26 is preferably able to pivot so that a distal end thereof can be raised or lowered to mate with the docking boom 22.

The vehicle-charging boom 26 is housed within a recessed compartment (not shown) located on a hood of the vehicle 16. Alternately, the vehicle-charging boom 26 may also extend outward (not shown) from a front-end of the vehicle 16 (i.e., the grille of the vehicle 16).

Figure 3:
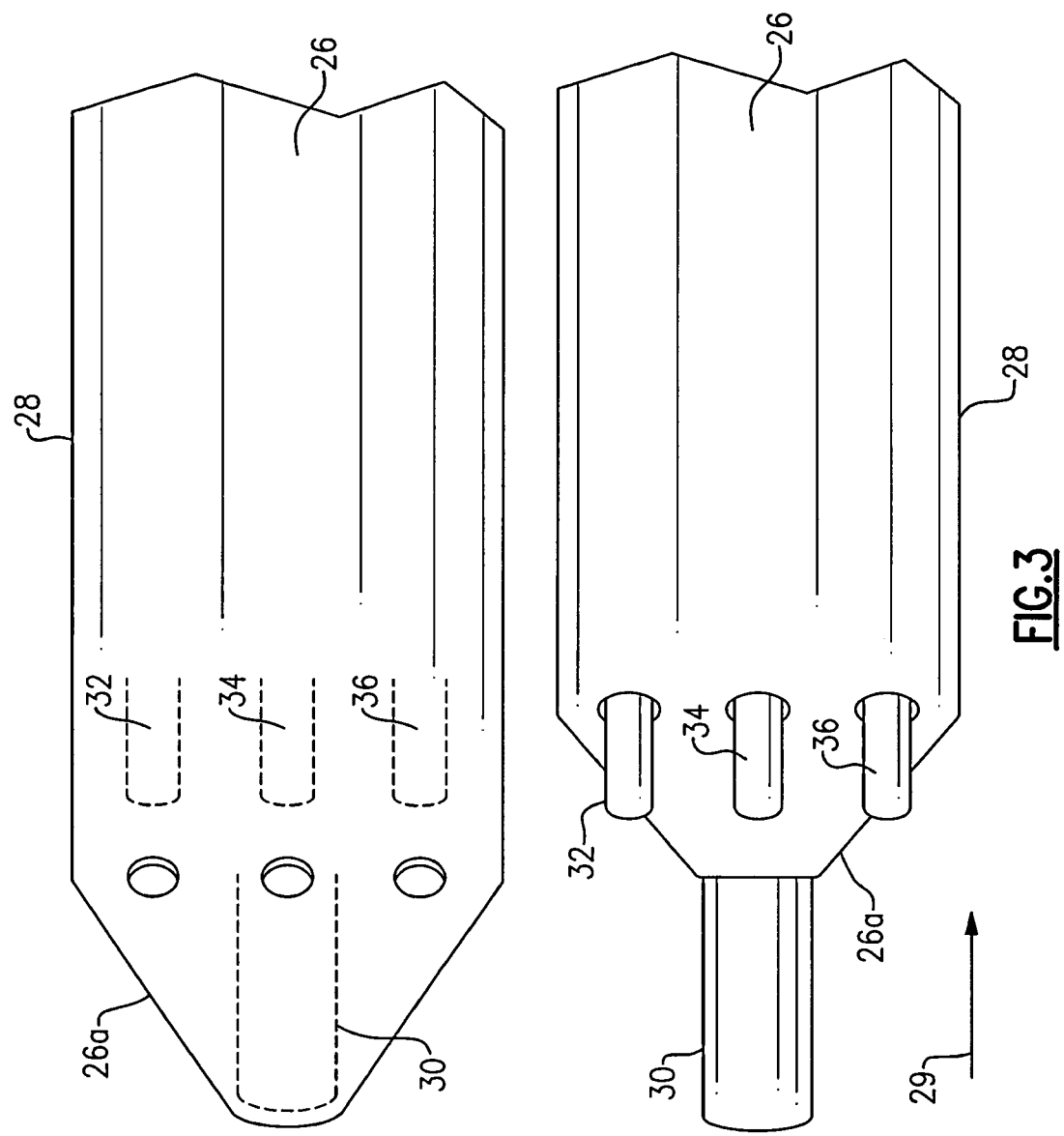
FIG. 3 is a partial side view of a vehicle-charging boom shown in a disengaged and an engaged position.

Referring now also to FIG. 3, a sleeve 28 surrounds a male cone-shaped end 26*a* located on an upper portion of the vehicle-charging boom 26. The sleeve 28 will be described in greater detail, hereinafter.

Figure 2:
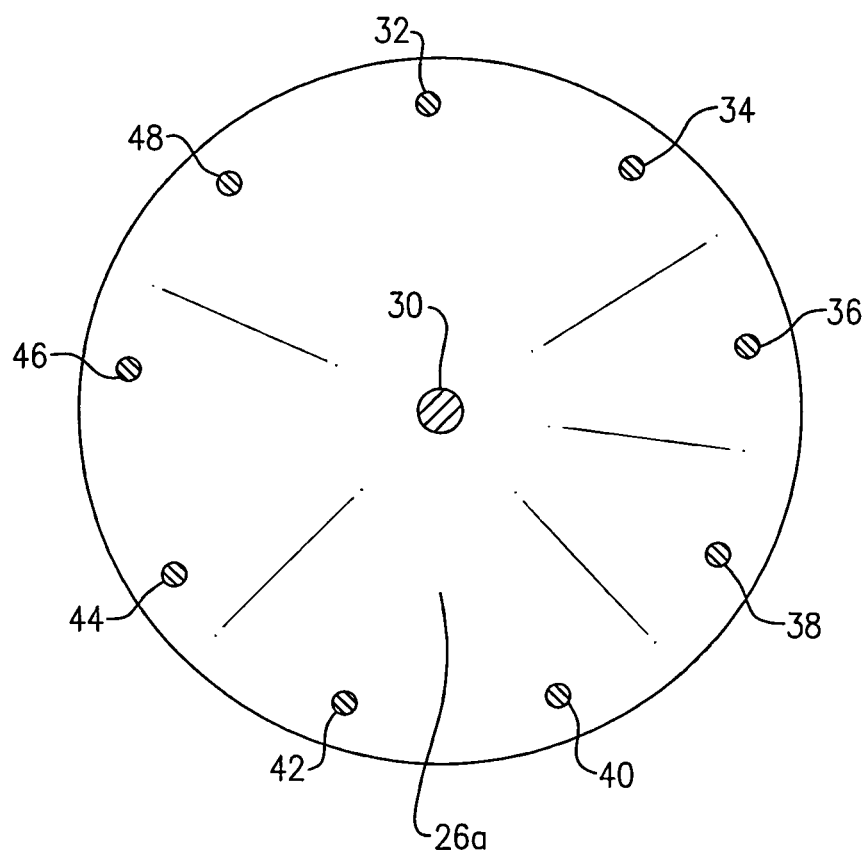
FIG. 2 is a cross-sectional view taken along line 2-2 of FIG. 1 of a vehicle-charging boom.

Referring now also to FIG. 2, is shown a cross-sectional view of the male cone-shaped end 26*a* of the vehicle-charging boom 26 and the electrical contact pins taken along line 2-2 of FIG. 1. The female cone-shaped opening 22*a* of the docking boom 22 includes sockets that correspond and electronically connect with the electrical contact pins of the vehicle-charging boom 26.

A centerline pin 30 is included at a center position on the male cone-shaped end 26*a*. The centerline pin 30 is used to electrically ground the vehicle 16 to the charging station 10 in order to prevent risk of electrical or static shock. The centerline pin 30 is the first of the electrical contact pins to engage with one of a plurality of sockets (not shown) located within an interior of the docking boom 22 and the last to disengage during disconnection.

As shown, nine electrical contact pins surround the centerline pin 30. Depending on the desired communications between the vehicle 16 and the charging station 10 determines how many electrical contact pins may be included on the male cone-shaped end 26*a* of the vehicle-charging boom 26 and sockets correspondingly on the female-cone shaped opening 22*a* of the docking boom 22. Each electrical contact pin is preferably spring-loaded and positioned on a socket (not shown) so that it is able to swivel slightly to accommodate odd angles, should the vehicle-charging boom 26 be connected in a less than perfectly straight orientation. This provides the important benefit of allowing faster and easier connections to occur between the vehicle 16 and the charging station 10.

As mentioned previously, each individual electrical contact pin has its own purpose. For example, some provide the charging current while others are used for vehicle 16 identification, charging and billing processes.

A neutral pin 32 is provided and is used during a charging of the vehicle 16. Three of the electrical contact pins each correspond to a different phase for charging of the vehicle 16. A single-phase charging pin 34 provides an electrical voltage of 120-VAC. A two-phase charging pin 36 used in concert with the single-phase charging pin 34 provides an electrical voltage of 240-VAC. A three-phase charging pin 38 provides a maximum rate of charge when also using the two other charging pins 34, 36. As may be required, the supplied electrical voltage is adjusted (i.e., AC to DC, if required) and a current is regulated to conform with the vehicle's 16 charging parameters.

Almost all vehicles 16 are (or will be) able to accept the single-phase charge cycle, using only the single phase charging pin 34 and the neutral pin 32. By providing two or three phase charging capability that is tailored to the type of the vehicle 16, the most rapid and safe charging is accomplished.

The remaining electrical contact pins are used for general communications, such as supplying identification of the vehicle 16, to assist in billing and payment for the electrical energy that is used to charge the vehicle 16, and for the exchange of any other additional desired data regarding the vehicle 16.

During electrical connection, the docking boom 22 is lowered and the vehicle-charging boom 26 is raised. The vehicle 16 advances until the male-cone shaped end 26*a* enters the female cone-shaped opening 22*a* and electrical connection between all the pins (30-48) is made. At that time the charging station 10 provides an indication, such as a written message or other indication that appears on the charging station 10 or in the vehicle 16, to the driver of the vehicle 16 to stop their advance of the vehicle 16. Additional detail of connection is provided later (See FIG. 3).

The specific protocol of communication (serial, parallel, RS-232, proprietary) is not described and is a design parameter that is chosen, as desired. Therefore, it is necessary that at least two pins will be used simultaneously for serial data exchange (ground and signal) and it is possible that several contact pins will be used simultaneously for any given parallel data exchange protocol to communicate all necessary information between the vehicle 16 and the charging station 10.

The actual meaning of any contact pin will vary depending on the communication protocol that is used. For the purpose of improving clarity of understanding, the various contact pins are assigned specific communication meanings in the following description. This is useful in understanding the type of information that can be communicated. It is to be understood that no limitation in the type of communication protocol that is to be used is implied or intended.

The vehicle's 16 unique vehicle identification number (VIN) may be transmitted to the charging station 10 by a VIN pin 40 or by use of various contact pins, as desired. The VIN pin 40 provides transmission of a make, model, and year of the vehicle 16. The VIN provided by the VIN pin 40 to the charging station 10 can be used by the charging station 10 to determine the type of the batteries 14 and all charging parameters for any given vehicle 16 by a lookup. If changes in the vehicle's 16 batteries 14 or charging parameters occur for any given model (even during the same model year), these changes will be reflected in the vehicle's 16 VIN. Accordingly, the charging station 10 can always configure itself to optimally charge any particular version of the vehicle's 16 batteries 14.

After connection to the docking boom 22 is complete, the vehicle's 16 VIN is sent to the computer 18. The computer 18 checks the VIN to see if the vehicle 16 has been reported stolen to any law enforcement agency.

If the vehicle 16 is determined to be stolen, the charging station 10 provides a significant unexpected benefit. The charging station 10 is able to report over the Internet (or other preferred communication means) a specific location of the vehicle 16 via a GPS (Global Positioning System) signal to a proper law enforcement agency.

A GPS pin 42 is preferably also included on the vehicle-charging boom 26. The GPS pin 42 or other communication protocol is used to communicate the vehicle's 16 location to the computer 18. An accompanying GPS system and device 52 (FIG. 3) is preferably included on a dashboard 50 of the vehicle 16. The charging station 10 preferably also includes its own GPS coordinates for transmission to the law enforcement agency, if necessary.

A stolen vehicle 16 will not be able to receive a charge by the charging station 10, although, if desired, it could appear to be charging the vehicle 16. This could be useful in delaying departure of the vehicle 16. If the vehicle 16 is not stolen, a method of payment for the electrical charge is then required.

A debit or credit card pin 44 on the vehicle-charging boom 26 may be used to directly supply the driver's preferred debit or credit card information to the charging station 10. Ideally, the vehicle 16 is modified to contain that information for transmission to the charging station 10. Other methods for providing the debit or credit card information including use of a card reader 56 and a keypad 58 will be described in greater detail, hereinafter.

During charging of the vehicle 16, the vehicle's 16 charging parameters are closely monitored by the charging station 10. A charging diagnostic pin 46 may be included on the vehicle-charging boom 26 that helps communicate important data between the vehicle 16 and the charging station 10 or from the charging station 10 to the vehicle 16 to inform the driver.

An additional communications pin 48 (or pins) may also be included on the vehicle-charging boom to further accommodate communication between the vehicle 16 and the charging station 10.

The vehicle 16 will not be charged should the charging station 10 detect a severe-enough mechanical or electrical problem within the vehicle 16. Any diagnostic obtained by the charging station 10 communicates the problem via a computer code through the charging diagnostic pin 46 to the vehicle's 16 on-board diagnostic (OBD-II) system or other available technology. For example, the charging station 10 could communicate this information to the vehicle 16 through the contact pins (32-48) or by wireless communication.

If the battery or batteries 14 do not properly charge, the charging station 10 communicates the reason through the charging diagnostic pin 46 or communications pin 48 to the vehicle's 16 OBD-II system or to any other part of the vehicle 16 to inform the driver. An unexpected benefit is provided in that this type of monitoring can help to prevent battery 14 failure or other more serious problems and an inoperative vehicle 16. The driver may then be notified that their vehicle 16 is in need of service. In this way minor problems can be repaired before they become serious.

The charging station 10 monitors the batteries 14 to verify that the proper current and rate of charge is being provided to the batteries 14. In addition, the charging station 10 monitors the batteries' 14 temperature to ensure that the batteries 14 do not overheat during charging. Should the batteries 14 begin to overheat, the charging station 10 will either slow the rate of charge or shut down depending on whether or not the vehicle's 16 charging parameters have been exceeded and to what extent they have been exceeded. These parameters may be provided by the vehicle 16 manufacturer and downloaded to computer 18 of the charging station 10.

An overheated battery or batteries 14 is prone to catch fire or explode and can pose a serious risk to the driver of the vehicle. Another unexpected benefit is provided in that the charging station 10 lessens the risk of the vehicle 16 from catching fire due to an overheated battery 14 as the battery 14 is being monitored throughout the entire charging cycle.

Also, by ensuring that the battery does not exceed it maximum permissible operating temperature during charge, the rate of charge can always be modulated (varied) to ensure that the batteries 14 are being charged as quickly as possible. By balancing the rate of charge with battery 14 temperature the fastest possible rate of charge is provided for each type of the vehicle 16.

Referring now to FIG. 3, the male cone-shaped end 26a of the vehicle-charging boom 26 is shown in a disengaged (top) and an engaged (bottom) position with respect to the charging station 10. In the disengaged position, the vehicle-charging boom 26 is not connected to the docking boom 22 of the charging station 10. In the engaged position, the vehicle-charging boom 26 is electrically connected to the docking boom 22 of the charging station 10. However for clarity, the docking boom 22 has been removed from FIG. 3.

The sleeve 28 protects the centerline pin 30 and electrical contact pins 32-48 disposed around the male cone-shaped end 26a. As mentioned previously each individual contact pin 32-48 (together or individually) serves an important purpose in verification, battery 14 charging and billing processes performed by the charging station 10. The sleeve 28 provides protection from exposure to weather, dust and other damage which may interfere with any of the pins 30-48 performance.

As the vehicle-charging boom 26 is being connected to the docking boom 22, the male cone-shaped end 26a contacts an interior surface of the female cone-shaped opening 22a of the docking boom 22. The sleeve 28 is spring-loaded to permit movement of the sleeve 28 along a longitudinal length of the vehicle-charging boom 26. As the male cone-shaped end enters the female cone-shaped opening 22a, the sleeve 28 is pushed back, as shown by arrow 29, to expose the centerline pin 30 and the electrical contact pins 32-48 located on the male cone-shaped end 26a.

Once the sleeve 28 is no longer covering the centerline pin 30, the centerline pin 30 engages with a center socket (not shown) located in the interior of the docking boom 22. The remaining contact pins 32-48 progressively engage with their respective sockets located on the docking boom 22 in a desired sequence. By controlling the length of each of the contact pins 32-48, the order in which electrical connection is made can be established. The charging station 10 will not begin to charge the vehicle 16 until it has verified that a full and complete electrical connection of electrical conductors (i.e., pins 30-48) has occurred between the vehicle-charging boom 26 and the docking boom 22.

After the vehicle 16 is fully charged, the vehicle-charging boom 26 is disengaged from the docking boom 22 by backing the vehicle 16. After disengagement, the sleeve 28 automatically moves forward in an opposite direction of arrow 29 to cover the centerline pin 30 and the electrical contact pins 32-48. As the sleeve 28 is spring-loaded, a release of tension provided by the female cone-shaped opening 22a allows the sleeve 28 to move to forward and into a quiescent state.

Figure 4:
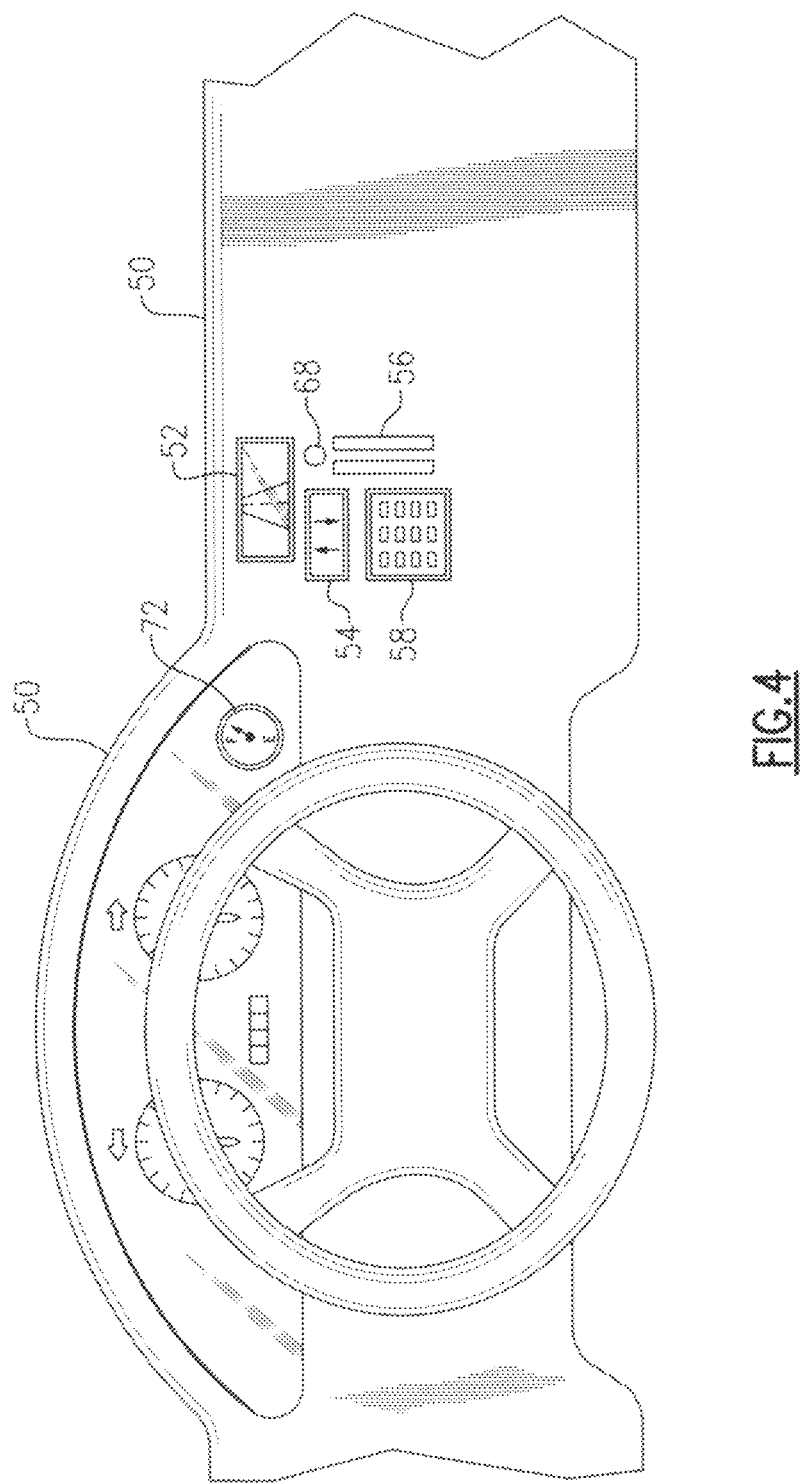
FIG. 4 is a partial view of a dashboard of the electric or hybrid vehicle of FIG. 1.

Referring now to FIG. 4, a control button 54 is shown on the dashboard 50. The control button 54 (or buttons) activates movement of the vehicle-charging boom 26. The vehicle-charging boom 26 is either lifted upward or lowered downward by an actuator or any other preferred means. By pressing the control button 54, a door 16a (FIG. 1) of the recessed compartment within the hood of the vehicle 16 is opened and the vehicle-charging boom 26 is raised. Pressing the control button 54 again can be used to lower the vehicle-charging boom 26 or it can occur automatically after disengagement has occurred. The door 16a of the compartment protects the vehicle-charging boom 26 when it is not in use.

To connect to the charging station 10, as the driver of the vehicle 16 approaches the parking space of the charging station 10, the driver presses the control button 54 on the dashboard 50. The door 16a is opened and the vehicle-charging boom 26 is raised upward from within the compartment in the hood of the vehicle 16.

Once the vehicle-charging boom 26 has been raised either a fixed amount or a variable amount, a wireless electronic signal may be transmitted to the charging station 10. The signal may include BLUETOOTH™, Wi-Fi, or any other preferred wireless communication. The wireless signal transmits crucial data regarding the vehicle 16 instead of transmission through the electrical contact pins. The data included in the wireless signal provides required identifying information such as the make, model and year of the vehicle 16 as well as the type of battery or batteries 14 used within the vehicle 16. Different vehicles 16 will have different types of batteries 14, especially as battery 14 technologies evolve.

However, using the data supplying electrical contact pins 40-48 instead of a wireless protocol to supply the desired data to the charging station 10 provides an unexpected benefit. By directly connecting to the charging station 10 to transmit the vehicle's 16 parameters and the driver's payment information, ensures that a secure transfer of the data is provided. A hacker is not able to intercept the transmission of data from the vehicle 16 to the charging station 10. The hacker could possibly access the data through the wireless signal that is transmitted to the charging station 10 which is provided by BLUETOOTH™, Wi-Fi, or by any other preferred wireless communication.

Now referring back to FIG. 1, as the vehicle 16 continues to move forward toward the charging station 10, the docking boom 22 aligns itself along a center longitudinal axis with respect to the vehicle-charging boom 26. The vehicle's 16 GPS system 52 may also be used to help align the vehicle 16 with the docking boom 22 and ensure proper advance by the vehicle 16. For example, the charging station 10 may use the vehicle's 16 GPS data it receives to confirm and indicate to the driver (by a green light or message) proper positioning and approach of the vehicle 16 to the charging station 10.

The data sent to the charging station 10 includes a height and an angle description of the vehicle-charging boom 26 and the pivot joint 24 of the docking boom 22 adjusts the height of the docking boom 22 accordingly. Preferably, all vehicles 16 will have a standard height and angle for the vehicle-charging boom 26. However, the charging station 10 can vary the position of the docking boom 22 to accommodate non-standard positions of the vehicle-charging boom 26.

The centerline pin 30 is the first of the electrical contact pins to connect to the docking boom 22. The centerline pin 30 cooperatively engages with a center socket 60 located within the interior of the docking boom 22. This is used to ground the vehicle 16 to the charging station 10. This prevents static electricity buildup from possibly damaging any of the electrical components of the vehicle 16 or the charging station 10. The remaining electrical contact pins 32-48 cooperatively engage with the plurality of sockets (not shown) also located within the interior of the docking boom 22 in the desired sequence.

Once all of the electrical contact pins 30-48 included on the vehicle-charging boom 26 make proper connection with the docking boom 22 of the charging station 10, a red light 62 is illuminated on the charging station 10 or another indication is provided. The red light 62 notifies the driver that a complete connection between the docking boom 22 and the vehicle-charging boom 26 has been accomplished. Any preferred color other than red may be used to provide the light 62 indication of the complete connection or a written message to stop can be displayed on the charging station 10 or in the vehicle 16.

The red light 62 also notifies the driver to stop moving the vehicle 16 forward and to place the vehicle 16 in park. A concrete stopper 64 may be provided proximate the front-end of the parking space to prevent the driver from driving too far forward and impacting either the charging station 10 or the concrete support block 12.

Referring to FIG. 4, a card reader 56 is preferably included on the dashboard 50 of the vehicle 16. The card reader 56 allows the driver to swipe a debit or credit card (not shown) as a means for payment for the electrical charge that is to be supplied to their vehicle 16. The swiped debit or credit card information is transmitted through the debit or credit card pin 44 to the charging station 10. As previously mentioned, the debit or credit card information may also be sent via the wireless signal to the charging station 10.

A keypad 58 may also be provided on the dashboard 50. The keypad 58 may be used to enter a pin number that is associated with the debit card that is swiped in the card reader 56.

In addition, the keypad 58 may be used to enter a user code to verify that an authorized user is attempting to charge the vehicle 16. If an unauthorized user (i.e., car thief) or an unauthorized driver (i.e., a child) tries to enter an unrecognized credit or debit card or an improper user code, an unexpected benefit can be provided. The charging station 10 can be configured to contact the actual authorized user (owner) and notifies them by a telephone call, over the Internet or by any other preferred means that the unauthorized user or driver is attempting to charge their vehicle 16. The charge current or voltage will not be provided to the vehicle 16 should the unauthorized user or driver be detected.

If desired, a telephone number associated with the charging station 10 may be dialed by the authorized user (i.e., driver). An additional computer or the computer 18 within the charging station 10 may provide executable prompts or voice activated prompts for the driver to follow to enter in the required vehicle 16 data and means for payment.

Once the payment and user status have been confirmed, the vehicle 16 is ready for charging. A green light 66, either solid or pulsed, (or other preferred color) on the charging station 10 is illuminated to notify the driver that the vehicle 16 is accepting a charge. The driver may then exit their vehicle 16 while the vehicle 16 is being charged or, if desired, the driver may remain inside the vehicle 16.

An unexpected benefit is provided in that all business aspects of charging the vehicle 16, including electrical and mechanical connection and payment, are completed without the driver having to exit the vehicle 16.

A blinking green or other color light 66 on the charging station 10 may be used to indicate that the vehicle 16 is accepting only a partial charge. The partial charge may indicate that the battery or batteries 14 is/are not functioning properly for that vehicle 16 type.

The electrical contact pins 32-36 on the vehicle-charging boom 26 offer up to three-phase charging capability. As mentioned previously, the single-phase charging pin 34 to the neutral pin 32 provides the electrical voltage of 120-VAC. Between the single-phase charging pin 34 and the two-phase charging pin 36 is provided the electrical voltage of 240-VAC for more rapid charging. Use of the three-phase charging pin 38 along with the two other charging pins 34, 36 provides the maximum rate of charge possible for certain types of the vehicle 16. Depending on the vehicle's 16 specific battery (or batteries) 14 parameters determines which charging voltage and current, whether AC or DC, will be provided by the charging station 10.

After the vehicle 16 has been fully charged, a completion light 68 on the dashboard 50 may illuminate to notify the driver that the vehicle 16 has been fully charged. Alternately, a second completion light 70 may be illuminated on the charging station 10 or a written display message may be provided.

Once the charge has been completed, the driver may be notified by a call placed to their cellular phone from the charging station 10 informing the driver to return to their vehicle 16. The charging station 10 provides a receipt (not shown) that details how much electrical energy was supplied to the battery or batteries 14 and the amount that was billed to the authorized user's credit or debit card. The receipt can be a paper receipt, an email receipt, or it can be transmitted to the vehicle 16 for storage.

A meter on the charging station 10 (not shown) measures how much electrical energy was supplied to the vehicle 16. If desired, a charge gauge 72 may be included on the dashboard 50 of the vehicle 16 similar to that of a standard fuel gauge of a conventional-type of vehicle to indicate the current level of charge to the batteries 14.

The meter on the charging station 10 provides yet another unexpected benefit. Once all user and payment verification has been completed, the charging station 10 begins a metered charging of the vehicle 16. The charging station 10 measures how many amp hours of electrical energy and it's associated cost (i.e., the amount that has been billed to the debit or credit card) have been provided to the vehicle 16. This information is also provided to the driver. By measuring the amount of electrical energy supplied and the amount billed helps prevent errors and disputes from occurring.

Figure 5:
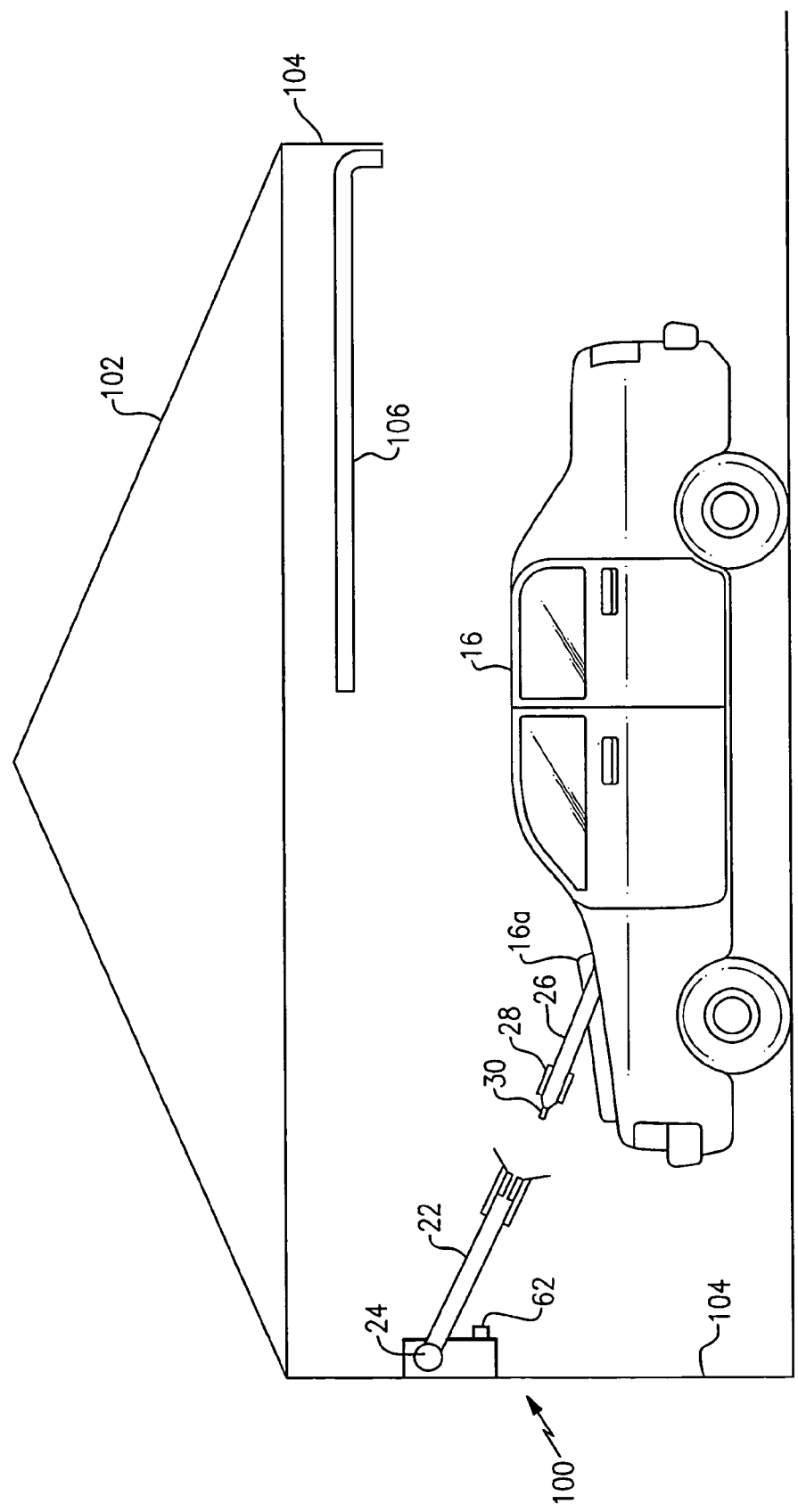
FIG. 5 is a modified embodiment of the automobile charging and communications station of FIG. 1 mounted on a wall of a garage for residential (i.e., home) use.

Now referring to FIG. 5, is shown a modified automobile charging and communications station, identified in general by the reference numeral 100. The modified charging station 100 is designed for use at a home or a residence 102. The modified charging station 100 is preferably located on a wall of a garage 104 of the user's residence 102.

The modified charging station 100 includes the docking boom 22, that is substantially identical to that which is included on the charging station 10. The docking boom 22 of the commercial charging station may be heavier duty. The docking boom 22 operates in the same manner as previously described for the charging station 10.

Upon opening of a garage door 106, the driver presses the control button 54 located on the dashboard 50. The door 16a on the vehicle 16 is opened and the vehicle-charging boom 26 is raised upward. If desired, the opening of the garage door 106 may trigger the modified charging station 100 to automatically lower the docking boom 22 into position. The driver aligns the vehicle-charging boom 26 with the docking boom 22 along the center longitudinal axis by driving the vehicle 16 forward.

The centerline pin 30 engages with the center socket 60 to ground the vehicle 16. The electrical contact pins 32-48 engage with the interior sockets of the docking boom 22. The red light 62 is illuminated on the modified charging station 100 to notify the driver that the connection between the docking boom 22 and the vehicle-charging boom 26 is complete and that the vehicle 16 should be stopped and put into park.

The driver may use the keypad 58 to enter their user code to begin the appropriate charging cycle based on the vehicle's 16 charging parameters. Alternately, the charge may be configured to always begin the charge without the user code when the vehicle 16 is at home 102.

Since the vehicle is at home 102, it is assumed that payment for the electrical energy supplied to the batteries 14 is not required. This is because the cost of charging the vehicle 16 will be reflected in the residential electric bill. If desired, the amount of electrical energy (amp hours) supplied to the vehicle 16 is noted and either stored by the modified charging station 100 or it is transmitted to the vehicle 16. Once the desired charging cycle has commenced, the driver exits the vehicle 16.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. In an improvement to a charging station for charging a battery or batteries of an electric or hybrid vehicle, wherein the improvement comprises a docking boom that is attached to said charging station, and wherein said docking boom extends from said charging station and includes an electrical connector at a distal end thereof, and wherein said electrical connector of said docking boom includes a mechanical and electrical interface with a corresponding electrical connector that is attached to said electric or hybrid vehicle, and wherein said mechanical and electrical interface is able to occur by positioning said electric or hybrid vehicle a predetermined distance away from said charging station so that a center of said corresponding electrical connector of said electric or hybrid vehicle substantially aligns with a center of said electrical connector of said docking boom if said vehicle is driven forward, and then slowly driving said electric or hybrid vehicle forward until said mechanical and electrical interface is accomplished;

wherein said docking boom includes a plurality of electrical sockets that are able to mate with a corresponding plurality of electrical pins that are included with said corresponding electrical connector of said electric or hybrid vehicle, or wherein said docking boom includes a plurality of electrical pins that are able to mate with a corresponding plurality of electrical sockets that are included with said corresponding electrical connector of said electric or hybrid vehicle;

wherein said plurality of electric pins or electrical sockets in said docking boom includes a single-phase pin or a single-phase socket and a neutral pin or a neutral socket, and wherein said single-phase pin or said single-phase socket of said docking boom and said neutral pin or said neutral socket of said docking boom each mate with a corresponding socket in said corresponding electrical connector of said electric or hybrid vehicle or each mate with a corresponding pin in said corresponding electrical connector of said electric or hybrid vehicle; and wherein a voltage across said single-phase pin and said neutral pin or across said single-phase socket and said neutral socket is equal to a desired AC or DC voltage, and wherein a current that is supplied to said single-phase pin or to said single phase socket is regulated by said charging station to correspond with any desired charging parameter of said battery or batteries.

2. The improvement of the charging station of claim 1 wherein said docking boom is pivotally attached to said charging station and wherein said distal end of said docking boom is able to be lowered to correspond with a position of said corresponding electrical connector of said electric or hybrid vehicle.

3. The improvement of the charging station of claim 2 wherein said docking boom includes a generally conical shaped female connector and wherein said female connector includes said plurality of electrical sockets that are able to mate with said corresponding plurality of electrical pins that are included with said corresponding electrical connector of said electric or hybrid vehicle, and wherein said corresponding electrical connector of said electric or hybrid vehicle is a male connector that includes a generally conical shape.

4. The improvement of the charging station of claim 3 wherein said sockets of said female connector or said pins of said male connector or both are able to each pivot about a socket sufficient to correct for a minor misalignment between said electrical connector of said docking boom and said corresponding electrical connector of said electric or hybrid vehicle.

5. The improvement of the charging station of claim 1 wherein said corresponding electrical connector of said electric or hybrid vehicle is attached to a vehicle-charging boom, and wherein said vehicle-charging boom is pivotally attached to said electric or hybrid vehicle.

6. The improvement of the charging station of claim 5 wherein said vehicle-charging boom includes a centerline pin that is a first pin to make electrical contact with one of said sockets of said electrical connector of said docking boom or wherein said vehicle-charging boom includes a centerline socket that is a first socket to make electrical contact with one of said pins of said electrical connector of said docking boom during charging and wherein said centerline pin is a last pin to lose electrical contact during disengagement of said electric or hybrid vehicle from said charging station or wherein said centerline socket is a last socket to lose electrical contact during disengagement of said electric or hybrid vehicle from said charging station.

7. The improvement of the charging station of claim 6 wherein said vehicle-charging boom includes a sleeve that includes a male conical shaped portion, and wherein said sleeve includes an opening in said male conical shaped portion for said centerline pin and for each of said plurality of pins, and wherein when said vehicle-charging boom is disposed in a quiescent state in which it is not mechanically or electrically connected to said docking boom said sleeve is disposed in a forward position that covers at least a portion of said centerline pin and which covers a remainder of said plurality of pins, and wherein when said vehicle-charging boom is mechanically and electrically connected to said docking boom said sleeve is not disposed in said quiescent state, and wherein said sleeve is urged away from said docking boom and into a rearward position in which said centerline pin and said remainder of said plurality of pins protrude through said openings and engage with said plurality of sockets in said electrical connector of said docking boom.

8. The improvement of the charging station of claim 7 wherein said sleeve includes a spring that supplies a biasing force sufficient to urge said sleeve into said forward position and into said quiescent state when said vehicle-charging boom is not mechanically or electrically connected to said docking boom.

9. The improvement of the charging station of claim 1 wherein said plurality of electric pins includes a two-phase pin and wherein said two-phase pin mates with a corresponding socket in said docking boom or wherein said two-phase pin mates with a corresponding socket in said corresponding electrical connector of said electric or hybrid vehicle, and wherein a voltage across said single-phase pin and said two-phase pin is equal to a desired AC or DC voltage and wherein a current that is supplied to said single-phase pin and said two-phase pin is regulated by said charging station to correspond with any desired charging parameter of said battery or batteries.

10. The improvement of the charging station of claim 1 wherein said plurality of electric pins includes a two-phase pin and a three-phase pin and wherein said two-phase pin and said three-phase pin each mate with a corresponding socket in said docking boom or wherein said two-phase pin and said three-phase pin each mate with a corresponding socket in said corresponding electrical connector of said electric or hybrid vehicle, and wherein a voltage across any of said single-phase pin and said two-phase pin and said three-phase pins is equal to a desired AC or DC voltage and wherein a current that is supplied to said single-phase pin or said two-phase pin or said three-phase pin is regulated by said charging station to correspond with any desired charging parameter of said battery or batteries.

11. The improvement of the charging station of claim 1 wherein certain of said plurality of pins and sockets are used to convey information between a computer of said charging station and said electric or hybrid vehicle.

12. The improvement of the charging station of claim 11 wherein said information includes a vehicle identification number of said electric or hybrid vehicle and, if available, a global positioning satellite coordinates of said electric or hybrid vehicle, a temperature of said battery or batteries of said electric or hybrid vehicle or any other information.

13. The improvement of the charging station of claim 12 wherein said other information includes debit or charge card information that is stored in said electric or hybrid vehicle or is entered in said electric or hybrid vehicle at a time of charging by an operator of said vehicle.

14. The improvement of the charging station of claim 12 wherein said other information includes diagnostic information about said electric or hybrid vehicle.

15. The improvement of the charging station of claim 12 wherein said other information includes a personal number that is entered on a keypad provided in said vehicle by an operator of said vehicle that is used to identify said operator of said electric or hybrid vehicle as an authorized driver, and wherein if said operator is unable to confirm that he or she is said authorized driver, said charging station will not provide an electrical charge to said batteries of said electric or hybrid vehicle.

16. The improvement of the charging station of claim 12 wherein said charging station uses said vehicle identification number to confirm whether or not said electric or hybrid vehicle is listed as being stolen, and wherein if said electric or hybrid vehicle is listed as being stolen said charging station communicates over the Internet or by other means a location of said electric or hybrid vehicle to a police department.

17. The improvement of the charging station of claim 11 wherein said information is transmitted between said vehicle and said charging station using a desired wireless protocol.

18. The improvement of the charging station of claim 17 wherein said charging station is able to place a call or send a text message to a cell phone of an operator of said electric or hybrid vehicle to inform said operator when said batteries of said vehicle are fully charged.

19. In an improvement to a charging station for charging a battery or batteries of an electric or hybrid vehicle, wherein the improvement comprises a docking boom that is attached to said charging station, and wherein said docking boom extends from said charging station and includes an electrical connector at a distal end thereof, and wherein said electrical connector of said docking boom includes a mechanical and electrical interface with a corresponding electrical connector that is attached to said electric or hybrid vehicle, and wherein said mechanical and electrical interface is able to occur by positioning said electric or hybrid vehicle a predetermined distance away from said charging station so that a center of said-corresponding electrical connector of said electric or hybrid vehicle substantially aligns with a center of said electrical connector of said docking boom if said vehicle is driven forward, and then slowly driving said electric or hybrid vehicle forward until said mechanical and electrical interface is accomplished;

wherein said corresponding electrical connector of said electric or hybrid vehicle is attached to a vehicle-charging boom, and wherein said vehicle-charging boom is pivotally attached to said electric or hybrid vehicle; and wherein said vehicle-charging boom includes a sleeve, and wherein when said vehicle-charging boom is disposed in a quiescent state in which it is not mechanically or electrically connected to said docking boom said sleeve is disposed in a forward position that covers at least a portion of said electrical connector of said electric or hybrid vehicle, and wherein when said vehicle-charging boom is mechanically and electrically connected to said docking boom said sleeve is not disposed in said quiescent state, and wherein said sleeve is urged away from said docking boom and into a rearward position in which said electrical connector of said electric or hybrid vehicle engages with said electrical connector of said docking boom.

\* \* \* \* \*